United States Patent [19]

Reimann

[11] Patent Number: 5,230,187

[45] Date of Patent: Jul. 27, 1993

[54] STAKE FOR LANDSCAPE EDGING AND CONCRETE FORMWORK

[76] Inventor: Lyall V. Reimann, 7631 Tweedsmuir Avenue, Richmond, British Columbia, Canada, V7A 1L1

[21] Appl. No.: 735,815

[22] Filed: Jul. 25, 1991

[51] Int. Cl.⁵ .................................................. E02D 5/80
[52] U.S. Cl. ......................................... 52/102; 52/155; 403/232.1; 256/1; 256/19; 256/DIG. 5; 248/545; 248/156
[58] Field of Search ............... 52/102, 365, 155, 369; 47/32, 33; 249/1, 3, 19; 403/232.1, 234, 235, 237; 256/1, 19, 20, DIG. 4, DIG. 5; 248/545, 156, 499, 500, 508

[56] References Cited

U.S. PATENT DOCUMENTS

| | | | |
|---|---|---|---|
| 683,799 | 10/1891 | Reavis | 256/65 X |
| 761,979 | 6/1904 | Moylan | 52/102 |
| 1,945,784 | 2/1934 | Myer | 47/33 |
| 4,508,319 | 4/1985 | Tappan et al. | 47/33 |
| 5,011,107 | 4/1991 | Reece | 248/545 |

*Primary Examiner*—Carl D. Friedman
*Assistant Examiner*—Robert J. Canfield
*Attorney, Agent, or Firm*—John R. Uren

[57] ABSTRACT

A stake (10, 80) is provided which can be used for edging gardens and lawns or for the formation of forms for concrete foundations and slabs. The stake (10, 80) is moulded from a synthetic plastic material and comprises a leading end (12) which is tapered for penetrating the ground and a trailing end (14) which is provided with a beam-receiving formation (16) thereon for receiving a beam therein. The beam receiving formation comprises at least one pair of planar side members (18, 20) which are spaced from one another. A plurality of the stakes can be provided as a garden edging kit or a concrete formwork kit.

7 Claims, 5 Drawing Sheets 5,230,187

STAKE FOR LANDSCAPE EDGING AND CONCRETE FORMWORK

FIELD OF THE INVENTION

This invention relates to a stake which is suitable for use in landscape edging, such as for lawn edging, as well as for the formation of forms for concrete foundations and slabs.

BACKGROUND OF THE INVENTION

Timber is used for building borders or walls on the ground to form edging for lawns and gardens. These edging systems comprise wooden members and means for anchoring the wooden members on the ground. However, the applicant is not aware of fastening means which is capable of use with different sizes of lumber and which does not require fastening members extending through the lumber. Accordingly, it is an object of the present invention to provide such fastening means.

When forms for concrete work, such as the laying of foundations or concrete slabs, are provided, these are normally hammered together using various pieces of wood and other materials for the anchoring of the formwork on the ground. These materials are normally discarded after use, thus requiring the process to be repeated when new formwork is required. It is accordingly, another object of the present invention to provide anchoring means for the formation of forms for concrete work which are reusable and adapted to be used with a variety of different types of lumber.

SUMMARY OF THE INVENTION

According to the invention, there is provided a moulded plastic stake having a leading end which is tapered for penetrating the ground and a trailing end provided with a beam-receiving formation thereon comprising at least one pair of planar parallel spaced side members for receiving a beam therebetween. Also according to the invention there is provided a garden edging kit which comprises a plurality of the stakes as described. According to a further aspect of the invention, there is provided a kit for the formation of forms for concrete foundations and slabs comprising a plurality of the stakes as described.

Further objects and advantages of the invention will become apparent from the description of a preferred embodiment of the invention below.

DETAILED DESCRIPTION OF PREFERRED EMBODIMENT

Figure 1:
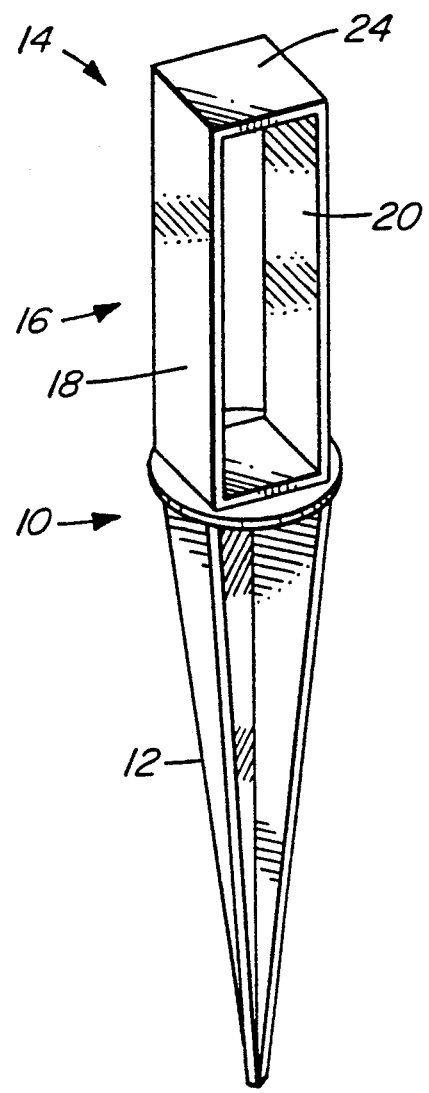
FIGS. 1-3 are isometric views of three different types of pegs or stakes which are suitable for use in garden or lawn edging according to the invention.

With reference to FIG. 1, reference number 10 generally indicates a stake which is moulded from a synthetic plastic material and having a leading end 12 which is tapered for penetrating the ground and a trailing end 14 which is provided with a beam-receiving formation 16 thereon. The beam-receiving formation 16 comprises a pair of parallel planar side members 18 and 20 which are spaced for receiving a beam (not shown) therebetween. The side members 18 and 20 are of equal size and joined together at their extremities by transverse sides 22 and 24 to define an elongate recess 26 for receiving the beam therethrough.

Figure 2:
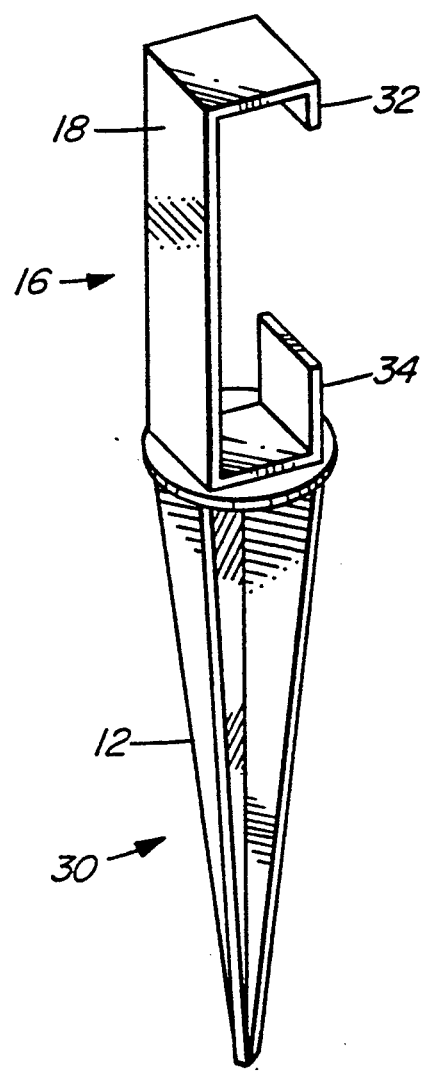

In FIG. 2, a stake 30 according to another embodiment of the invention in shown. The stake 30 also has a tapered leading end 12 and a beam-receiving formation 16 at its trailing end, but in this instance the one side member 18 is continuous as, in the case of FIG. 1, but the other side member is discontinuous and comprises a pair of lugs 32 and 34 which are spaced from each other in a longitudinal direction of the stake 30. Thus, the beam-receiving formation 16 in this embodiment is adapted to clip onto the lumber, whereas the slot-type formation 26 of the embodiment of FIG. 1, slides over the lumber, either freely or frictionally.

Figures 3, 4A, 4B:
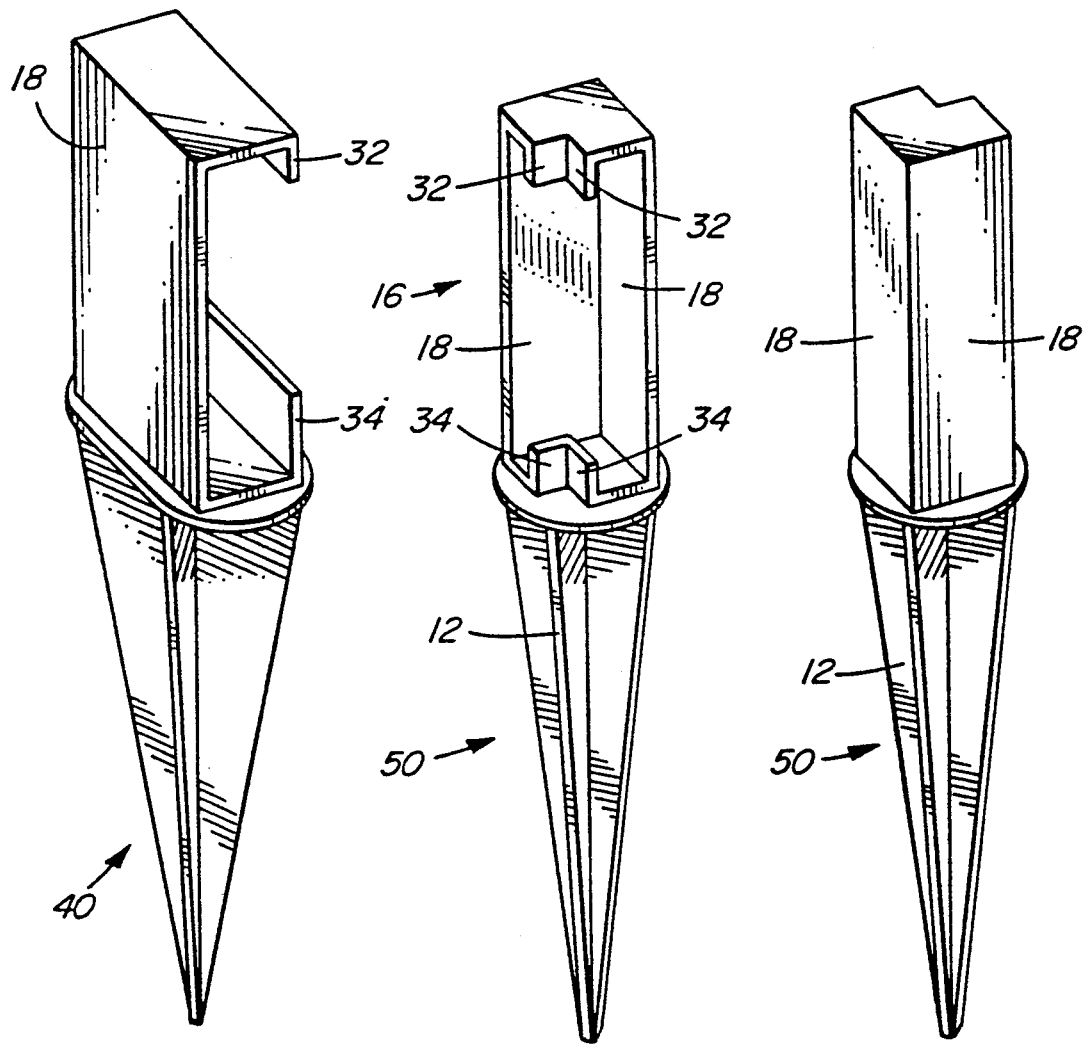
FIG. 4A and B are isometric front and rear views of a stake which is suitable for use in garden or lawn edging according to another embodiment of the invention.

In FIG. 3, reference number 40 indicates a stake which is similar to the embodiment shown in FIG. 2, except that the side member 18 and the lugs 32 and 34 are of greater width, as shown. This embodiment is intended for receiving two pieces of lumber in end-to-end abutting relationship for joining the pieces of lumber together.

In FIGS. 4A and B, reference numeral 50 generally indicates a stake which is intended for use at a corner and, therefore, the beam-receiving formation 16 comprises two pairs of side members which are located at right angles to each other, each of the pairs of side members comprising a continuous side member 18 and a discontinuous side member in the form of a pair of lugs 32 and 34 spaced longitudinally of the stake 50.

Figure 5A:
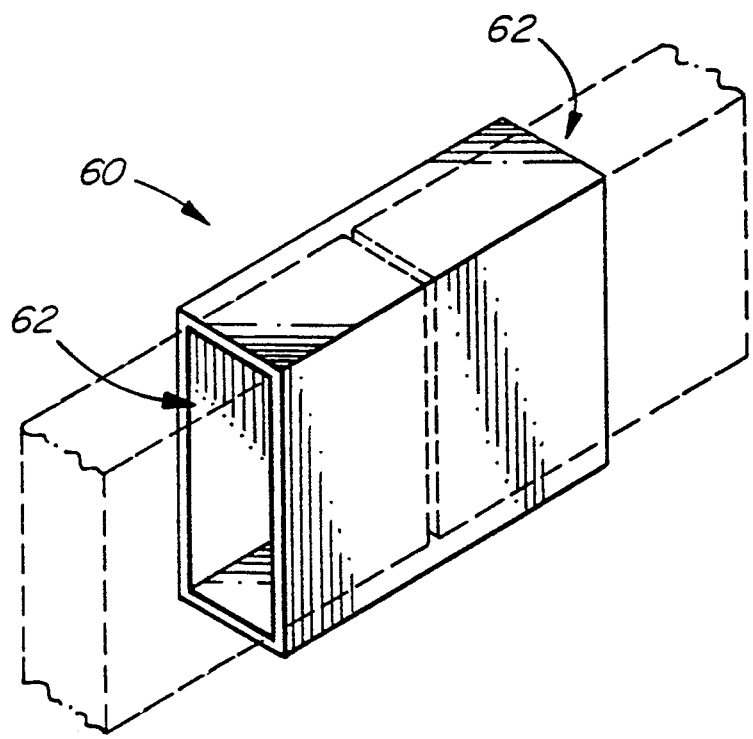
FIGS. 5A and B are isometric views of auxiliary connecting pieces which are suitable for use with the stakes of FIGS. 1-4 for lawn or garden edging according to the invention.
Figure 5B:
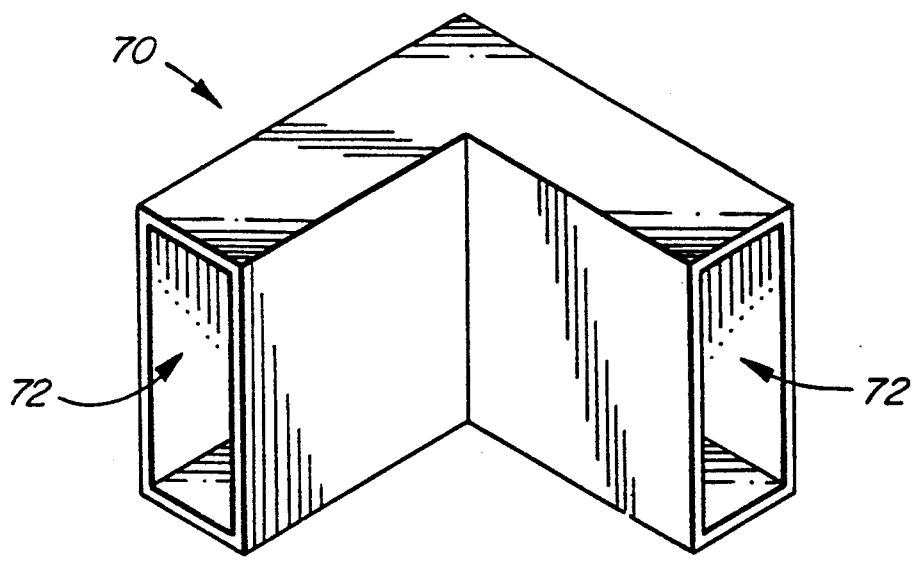

In FIGS. 5A and B, a pair of connection members 60 and 70 are shown which are intended for use with the stakes 10, 30, 40 and 50 in the formation of garden or lawn edgings. The members 60 and 70 are not intended for anchoring in the ground and are therefore not provided with spikes or tapered leading ends 12. The member 60 is intended for use in adjoining two pieces of lumber in end-to-end abutting relationship and the connection member 70 is intended for joining two pieces of lumber at a corner. The members 60 and 70 have rectangular slots 62 and 72 respectively, designed so that the pieces of lumber can simply slide in, either freely or with a friction fit.

The stakes 10, 30, 40 and 50, as well as the connection pieces 60 and 70, can be provided in a variety of sizes to fit different standard sizes of lumber; e.g. $\frac{3}{4}''\times2''$, $2''\times4''$, $\frac{3}{4}''\times6''$, $2''\times10''$, $2''\times12''$, etc.

The stakes 10, 30, 40 and 50, together with the auxiliary members 60 and 70, may be provided in kit form, thus providing a versatile system for the erection of garden edging of a variety of configurations using standard size lumber.

Such a kit may also include starter pegs (not shown) having beam receiving formations 16 with blank or closed ends, such as for use when starting the edging from up against a wall.

Figure 6:
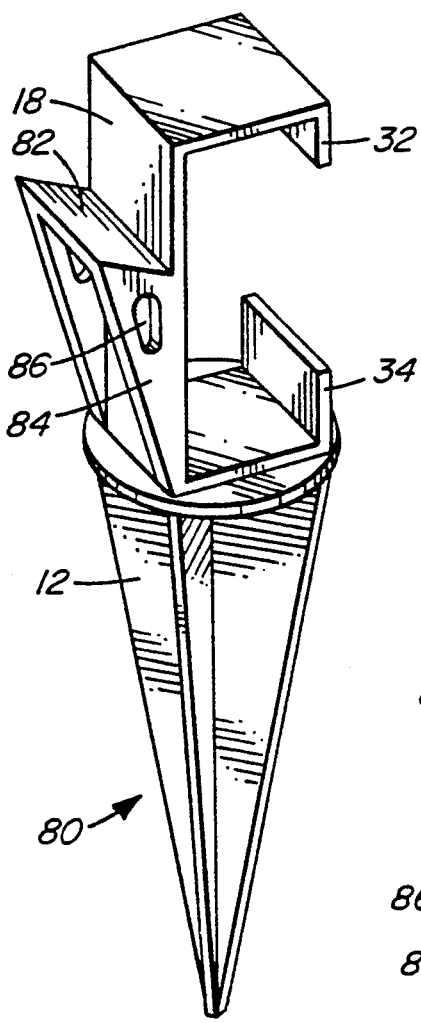
FIGS. 6 and 7 are isometric views of stakes which are suitable for use for the formation of forms for concrete foundations and slabs according to another aspect of the invention.

In FIG. 6, reference numeral 80 generally indicates a stake which is intended for use in the formation of a form for a concrete foundation or slab. The stake 80 corresponds generally with the stake 30 of FIG. 2, except that it is larger and more sturdy to adapt it to the more heavy duty application. The stake 80 is further provided with a striking surface or hammer pad 82 which is located on a reinforcing gusset 84, for driving the stake 80 into the ground. A hole 86 is provided in the reinforcing gusset 84 for extraction of the stake 80 from the ground.

Figure 7:
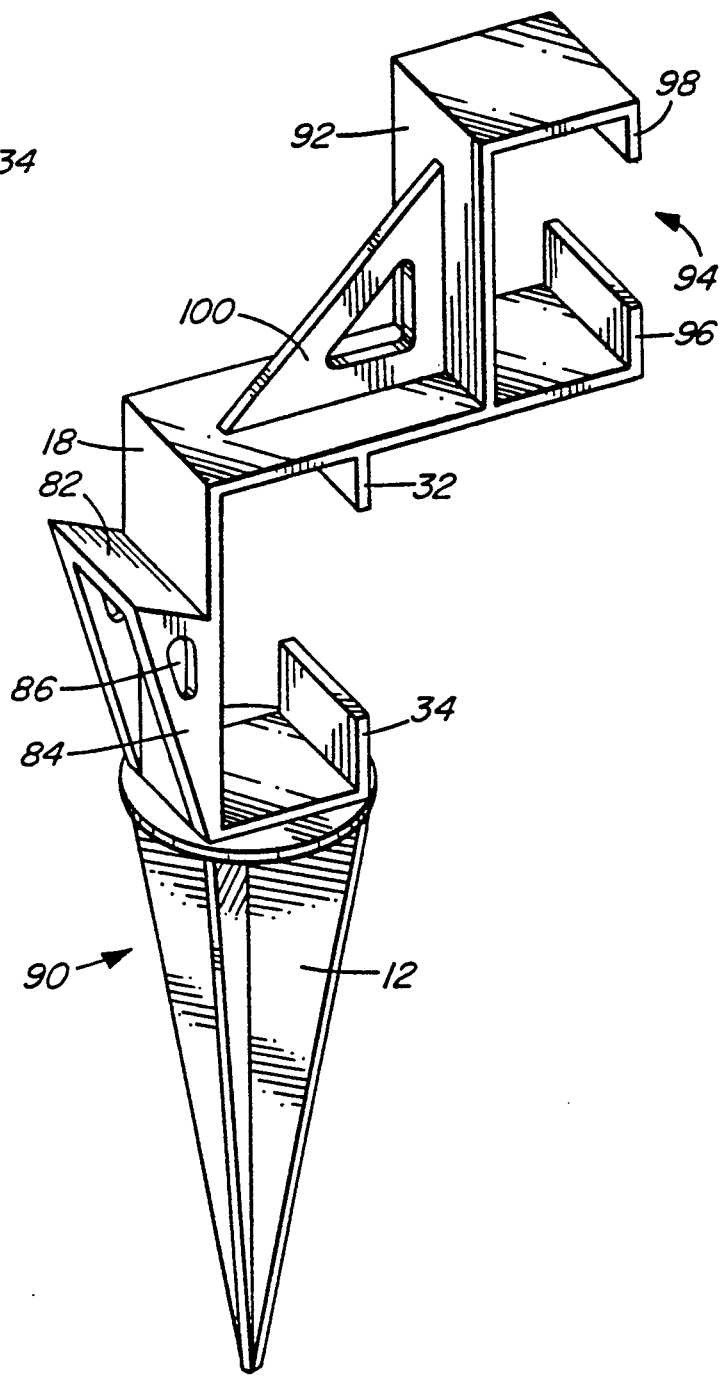

In FIG. 7, reference numeral 90 generally indicates a stake which is intended for use in the formation of formwork for a stepped foundation. In this embodiment, the stake 90 has a second pair of side members 92 and 94 which are laterally and longitudinally displaced from the first pair of side members 18 and 32, 34. The second side member 94 is discontinuous and comprises a pair of lugs 96 and 98 which are spaced from each other in a longitudinal direction of the stake 90. A reinforcing web 100, in the form of a right-angled member, is provided for properly aligning the two sets of side members in parallel relationship with respect to each other.

Figure 8:
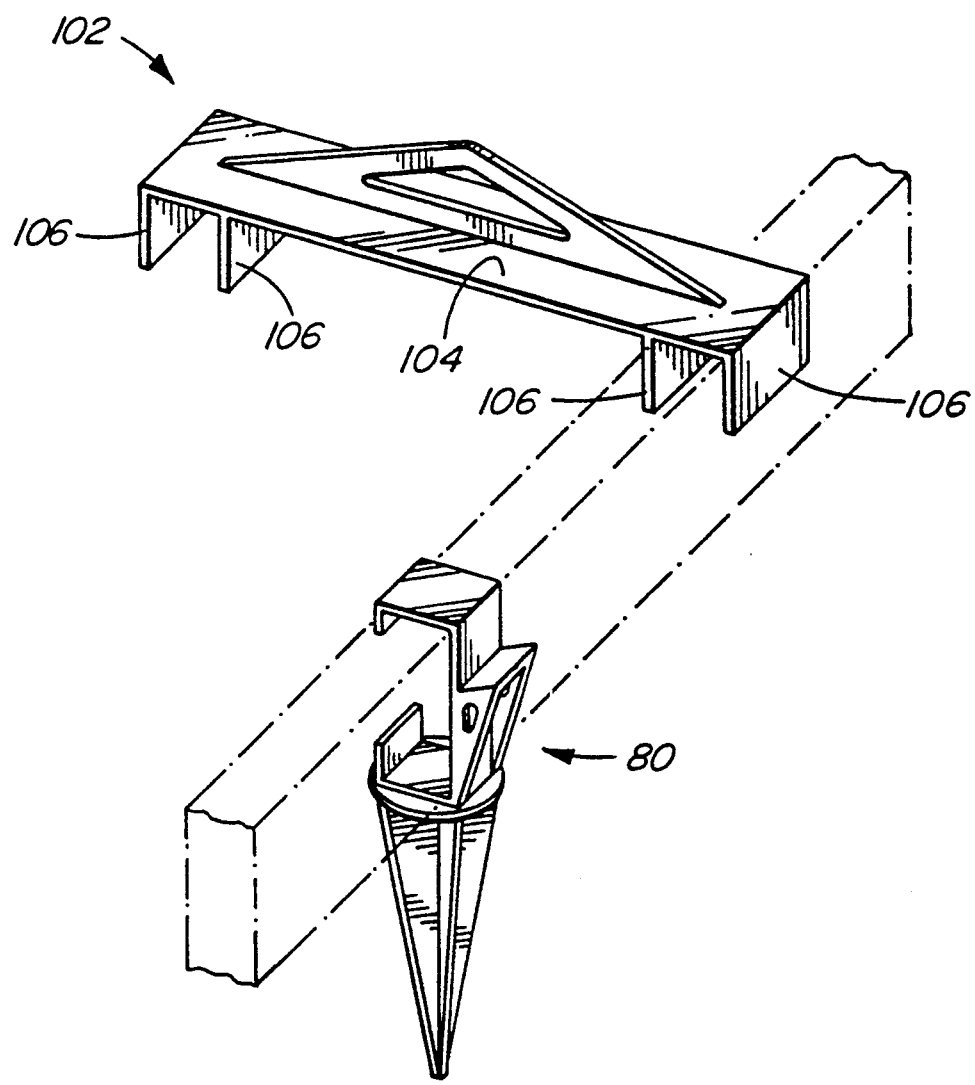
FIG. 8 is an isometric view of a spacer clamp which is suitable for use with the stakes of FIGS. 6 and 7 in the formation of forms for concrete foundations and slabs.

In FIG. 8, reference numeral 102 generally indicates a spacer clamp, which is intended for use with the stakes 80 and 90 in the formation of forms for concrete foundations and slabs. The clamp 102 comprises a planar body member 104 provided with a pair of guide members 106 at each end for clipping onto lumber to correctly space the lumber. The clamp 102 can be provided in different sizes to suit different standard sizes of lumber and to provide different required spacings.

The stakes 80 and 90 can be removed after use and re-used at different locations and may be provided in kit form so that different configurations of formwork can easily be erected as required.

Starter pegs for starting the formwork from up against a wall or other structure may also be provided, as in the case of the lawn edging pegs.

While only preferred embodiments of the invention have been described herein in detail, the invention is not limited thereby and modifications can be made within the scope of the attached claims.

What is claimed is:

1. A moulded plastic stake having a leading end which is tapered for penetrating the ground and a trailing end provided with means for receiving a beam thereon comprising at least one pair of planar parallel spaced side members for receiving a beam therebetween, wherein one of said side members is continuous, and the other side member comprises a pair of opposed lugs spaced from each other in a longitudinal direction of the stake, an upper one of said lugs being connected by means of a transverse member to said continuous side member.

2. The stake according to claim 1, wherein two pairs of said side members are provided to respectively receive the ends of two beams which are located at an angle to each other.

3. The stake according to claim 2, wherein said angle is a right angle.

4. The stake according to claim 1, further comprising a striking surface extending transversely of one of said side members.

5. A garden edging kit comprising a plurality of stakes according to claim 1.

6. The stake according to claim 1, further comprising a second pair of said side members on said trailing end, which are transversely displaced with respect to said first pair of side members for receiving a second beam which is transversely displaced from said first beam.

7. The stake according to claim 6, wherein said second pair of side members are also displaced with respect to said first pair of side members in a longitudinal direction of the stake.

* * * * *